United States Patent [19]

Bradbury

[11] Patent Number: 4,650,066
[45] Date of Patent: Mar. 17, 1987

[54] RETRACTABLE DRIVE ASSEMBLY FOR CONVEYOR

[75] Inventor: Bernard G. Bradbury, Chico, Calif.
[73] Assignee: Rexnord Inc., Brookfield, Wis.
[21] Appl. No.: 805,527
[22] Filed: Dec. 6, 1985
[51] Int. Cl.$^4$ .............................................. B65G 23/00
[52] U.S. Cl. ...................................... 198/832; 198/854
[58] Field of Search ................. 198/832, 854, 833, 319

[56] References Cited

U.S. PATENT DOCUMENTS

| | | | |
|---|---|---|---|
| 2,393,563 | 1/1946 | Petterson | 198/854 |
| 2,744,618 | 5/1956 | Seal | 198/203 |
| 2,992,725 | 7/1961 | Poundstone | 198/203 |
| 3,002,604 | 10/1961 | Brems | 198/137 |
| 3,104,751 | 9/1963 | Jackson et al. | 198/854 |
| 3,237,804 | 3/1966 | Bardy et al. | 198/832 |
| 3,291,286 | 12/1966 | Adams | 198/185 |
| 3,373,780 | 3/1968 | Lowther | 198/854 |
| 3,395,648 | 8/1968 | Karr et al. | 104/25 |
| 3,399,758 | 9/1968 | Karr | 198/832 |
| 3,576,250 | 4/1971 | Aitken | 198/854 |
| 3,718,249 | 2/1973 | Hess | 198/181 |
| 3,854,574 | 12/1974 | Theijsmeijer et al. | 198/181 |
| 3,881,609 | 5/1975 | Ellis et al. | 198/854 |
| 3,893,564 | 7/1975 | Raynor et al. | 198/189 |
| 4,476,974 | 10/1984 | Bradbury | 198/832 |

FOREIGN PATENT DOCUMENTS 284845  2/1928  United Kingdom ................ 198/854

*Primary Examiner*—Joseph E. Valenza
*Assistant Examiner*—Jonathan D. Holmes
*Attorney, Agent, or Firm*—William L. Falk

[57] ABSTRACT

A frame supported conveyor useful in handling baggage includes inclined flights connected to movable link plates to form an endless chain assembly. A drive arrangement located beneath the conveyor engages and moves the endless chain assembly about a closed planar path. The drive arrangement is movably mounted on the frame between an operating position in engagement with the endless chain assembly and a servicing position out of engagement with and movable away from the endless chain assembly.

19 Claims, 12 Drawing Figures

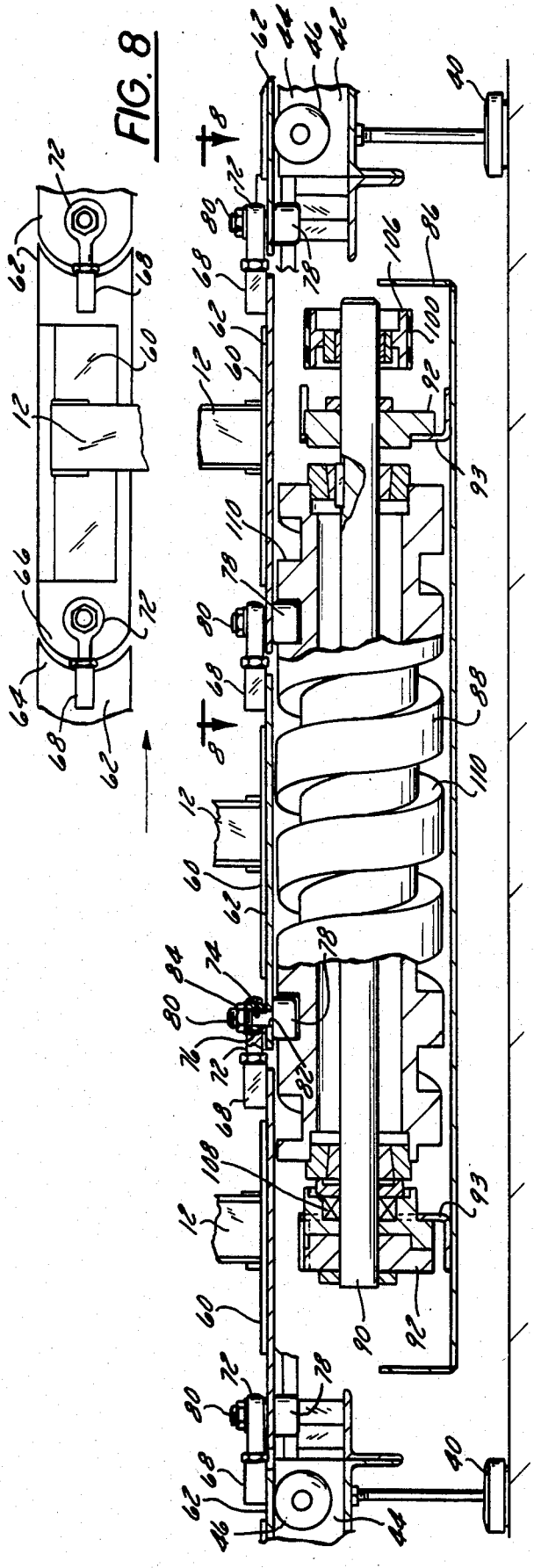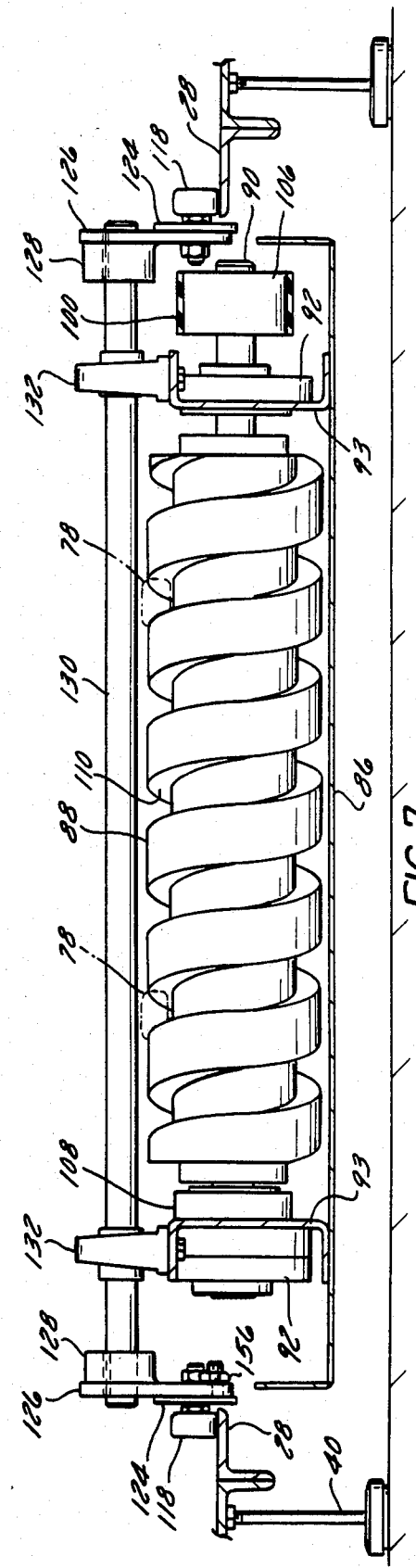

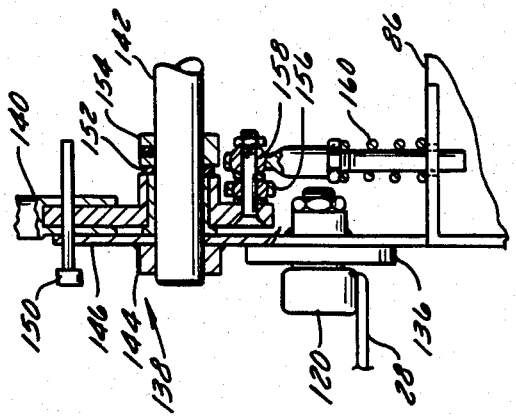

RETRACTABLE DRIVE ASSEMBLY FOR CONVEYOR

BACKGROUND OF THE INVENTION

This invention relates to improvements in conveyors and more particularly to drive arrangements used in conveyors which travel in an endless path and carry a plurality of interconnected members on which baggage or the like is conveyed.

It is well known in the prior art of material handling to distribute baggage or other parcels through the use of an endless conveyor. In such conveyors, suitably used for transport of baggage in airport, train and ship terminals, the baggage is typically deposited on a conveyor for delivery to another location or is transferred from one conveyor to another where the passengers may claim it. Such conveyors may be constructed with either generally horizontally disposed pallets or inclined flights and have employed various arrangements for propulsion.

For example, U.S. Pat. Nos. 3,854,574 and 3,893,564 are illustrative of conveyors employing chain and sprocket drives while U.S. Pat. Nos. 3,718,249 and 4,476,974 describe conveyors utilizing a barrel screw and cam follower to propel an endless chain. Each type of drive system is fixed in position generally beneath the conveyor for efficient power transfer and is mounted to the floor either directly or indirectly upon a support plate or pedestal which lies on the floor. Various improvements have been taught by these patents to upgrade the smoothness and quietness of these drives such as in the construction and location of bearings, guides and support devices for the chain, the barrel screw, the pitch of the drive chain and sprocket, and pallets and flights. However, there remains a need in this well developed art for a conveyor drive which is more easily accessible for inspection and servicing functions. For instance, when utilizing the drives shown in the aforementioned patents, access to the drive components is attained only by the removal of structural support members and flights or pallets, after which individual drive components must often be separately disconnected. Such tasks are normally cumbersome and, especially in the event of a breakdown, can result in unwanted downtime during which baggage quickly accumulates and travelers cannot normally claim their checked luggage. Airline carriers and transportation authorities are extremely cognizant of this problem and have voiced a request for advancement of more easily maintained drive arrangements.

An additional drawback with these and other prior art conveyor drive systems is related to their support and operation relative to the ground. Debris such as baggage tags, address labels, case handles, coat hangers, tie straps and fastening materials commonly gravitate and accumulate underneath the conveyor. For conveyors which use traveling support members which move on or near the ground surface or have moving drive components which operate at the ground level, clogging and shutdown of the drive system can occur. Because of this potential complication, there is also a need to provide a mounting for the drive arrangement of a conveyor which contemplates clearance from these obstacles.

Accordingly, it is a principal object of the invention to provide a smooth, simple and quiet drive arrangement which is more accessible for maintenance and less susceptible to jamming from foreign obstructions.

Another object of the invention is to furnish a drive arrangement peculiarly mounted between an operating and servicing position.

It is a further object of the invention to provide a drive mechanism having improved guide and support means for an endless chain conveyor both inside and outside the area of the drive arrangement.

A still further object of the invention is to provide a self contained drive arrangement which is positively engaged in a driving mode with an endless chain and can be mechanically disengaged and moved to a maintenance mode.

One of the salient features of the invention is a tiltable drive tray for supporting the drive arrangement.

An attendant feature of the invention lies in the adjusting mechanism for tilting the drive tray.

A further feature of the invention resides in the movement of the support wheels for the drive tray.

Another feature of the invention is found in the support orientation of the drive tray with respect to the stationary floor surface.

SUMMARY OF THE INVENTION

The present invention is directed to an improved conveyor for handling luggage or the like which attempts to solve the drawbacks of prior luggage handling conveyors.

In a preferred embodiment, the conveyor of the present invention discloses a plurality of load carrying, inclined flights disposed on link plates which are interconnected by pins and form an endless chain assembly adapted to rotate about a closed planar path defined by a floor supported frame. The endless chain is rotatably supported on rollers and guided by guide means. The endless chain assembly is driven by a drive arrangement, in the form of a barrel screw, located beneath the endless chain assembly and engaging a cam roller on the pins connecting the link plates. The drive arrangement is supported on a drive tray rollably suspended from the frame above the floor for moving the drive arrangement between an operating, chain engaging position and a retracted, servicing chain disengaged position.

The drive tray is provided with support wheels, certain of which are swingable about an auxiliary axis as well as rotatable about their own axes, so as to allow a tilting motion wherein the barrel screw disposed in the drive tray can be disengaged from the cam rollers. A toggle actuating mechanism provides the means by which the drive tray is held in either an operating or servicing position. The actuating mechanism includes a spring-biased lever joined to a connecting rod which acts upon an eccentric to swing the support wheels of the drive tray when desired.

The various features of novelty which characterize this invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWINGS

The invention and its attendant objects and advantages will become better understood by reference to the following detailed description of the preferred embodiment when read in conjunction with the following drawings wherein:

FIG. 6 is a fragmentary, sectional view taken along line 6—6 of FIG. 2;

FIG. 7 is a fragmentary, sectional view taken along line 7—7 of FIG. 2;

FIG. 8 is a top plan view of the link plates of the conveyor taken along line 8—8 of FIG. 6;

FIG. 9 is an end view of the drive arrangement of the conveyor taken along line 9—9 of FIG. 2;

FIG. 10 is an enlarged, fragmentary detail view of the toggle actuating mechanism of the drive arrangement shown in FIG. 9;

FIG. 11 is a side view of the drive arrangement of the conveyor taken on line 11—11 of FIG. 9.

DETAILED DESCRIPTION OF THE PREFERRED EMBODIMENT

Figure 1:
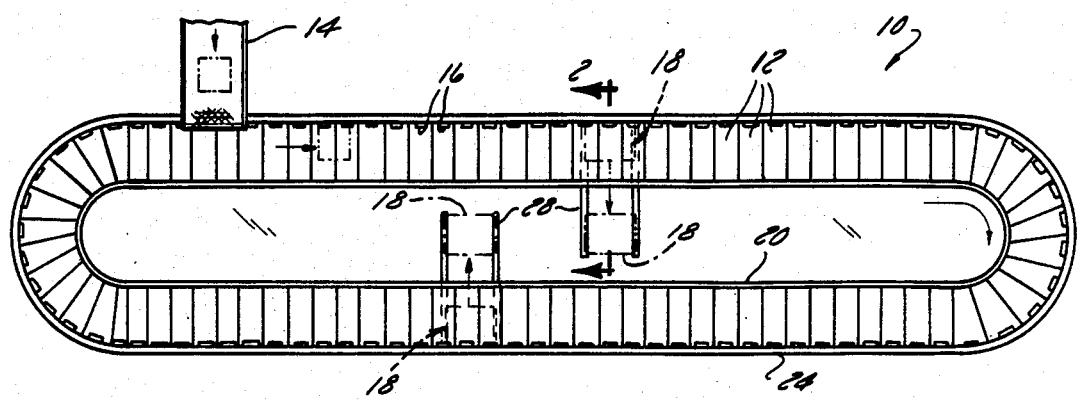
FIG. 1 is a top plan view of one form of the conveyor of this invention.

FIG. 1 illustrates a conveyor 10 used to transfer material along an endless path. The conveyor is constructed of a plurality of inclined, load carrying flights 12 and is fed by a suitable feed conveyor 14. A shock absorbing, resilient bumper 16 is mounted at the outer end of each flight 12. Drive means 18 drive a chain to which the outer portion of each flight 12 is connected to move the conveyor in its endless path. In the preferred embodiment, two drive means 18 are employed for a purpose to be later understood, but a single or several drive means may alternately be used. The conveyor flights 12 travel around the endless path between an inside surface 20 within which there is suitable decking 22 and an outside skirt 24.

The conveyor is particularly adapted for handling luggage at airports where luggage is fed in by the feed conveyor 14, slides down the inclined flights 12 and is cushioned by the resilient bumper 16. The pieces of luggage are transported around the conveyor for removal by people standing adjacent the outer perimeter of the conveyor. Each flight is designed so that it overlaps the adjacent flight and provides a minimum of catch points to avoid damage to luggage as the flights traverse the conveyor. Either of the conveyors 10, 14 may be constructed of other configurations or designs as desired for the particular luggage handling application. For example, the conveyor 10 may have straight sections and curved sections and many shapes, such as oval, square, "keyhole" or the like, while the feed conveyor 14 may come up through the center of the decking instead of over the conveyor 10.

Figure 2:
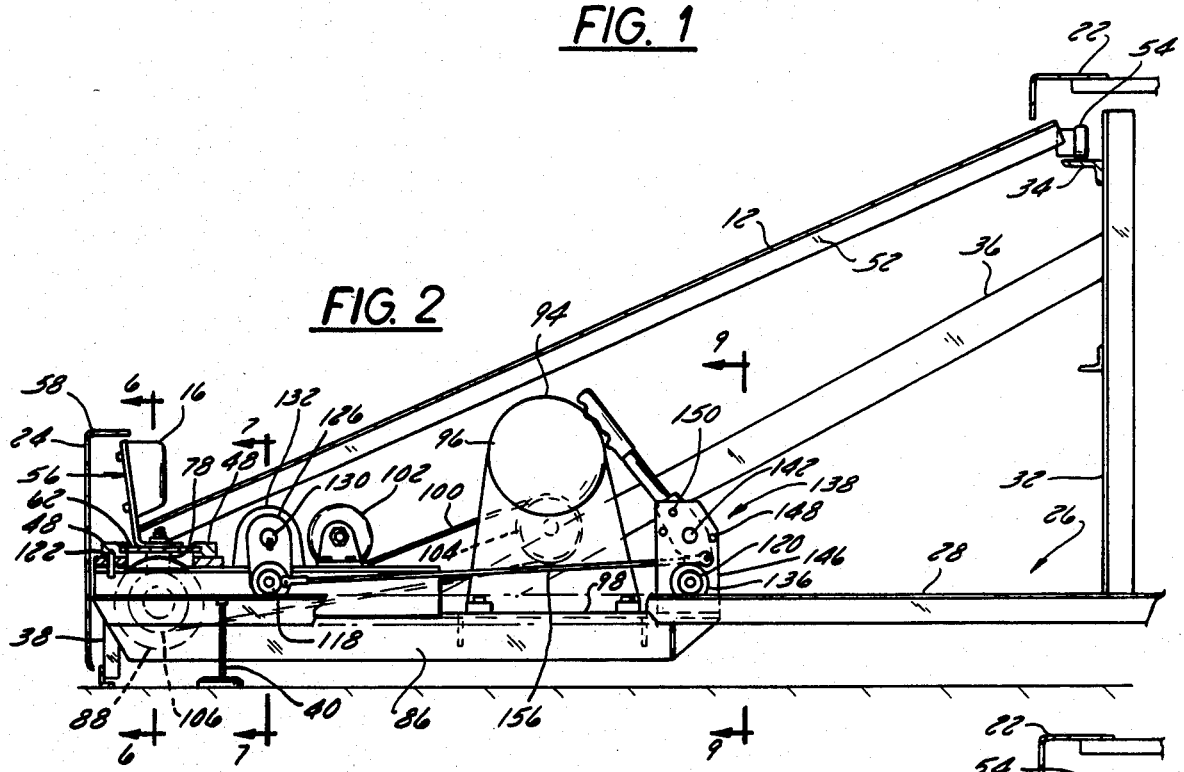
FIG. 2 is a sectional view taken along line 2—2 of FIG. 1 showing the drive arrangement of the conveyor being engaged.
Figure 3:
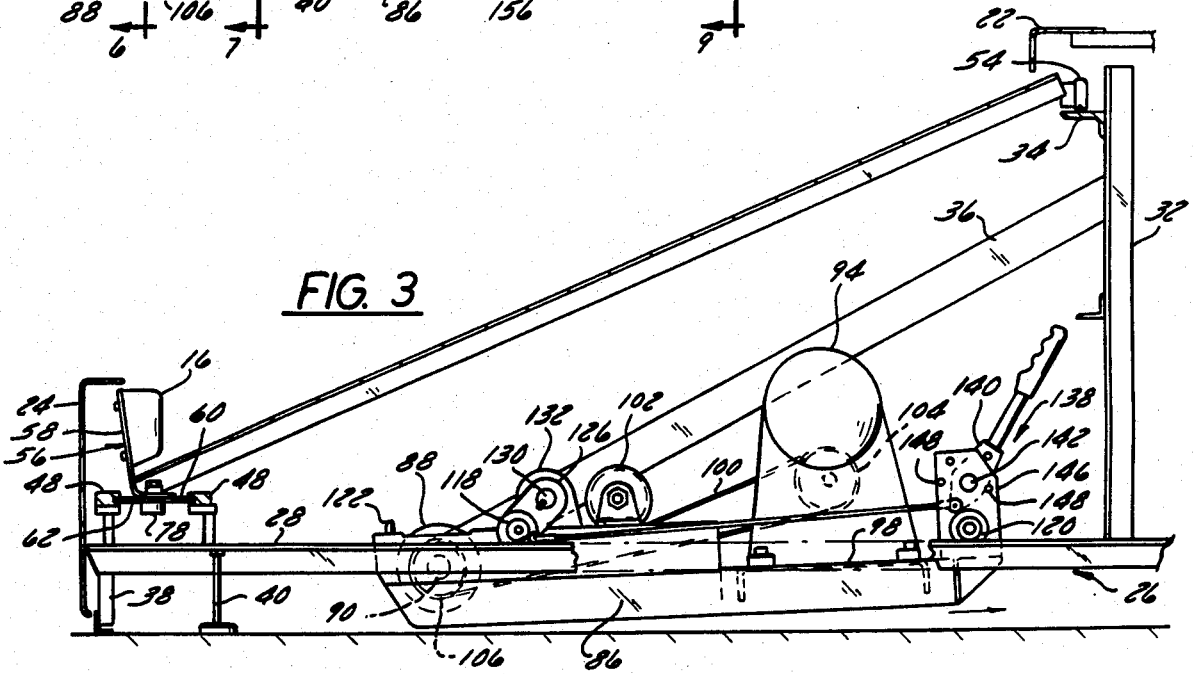
FIG. 3 is a sectional view similar to FIG. 2 showing the drive arrangement of the conveyor being disengaged and moved from beneath the conveyor.
Figure 4:
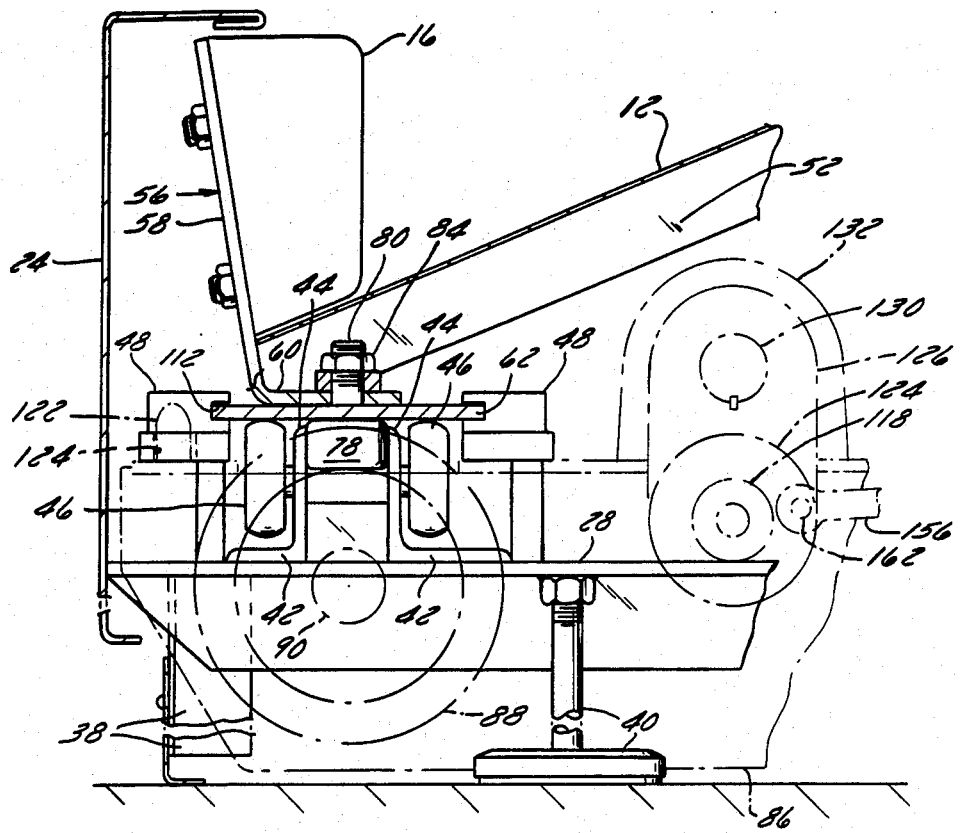
FIG. 4 is an enlarged, fragmentary detail view of the drive arrangement shown in FIG. 2.
Figure 5:
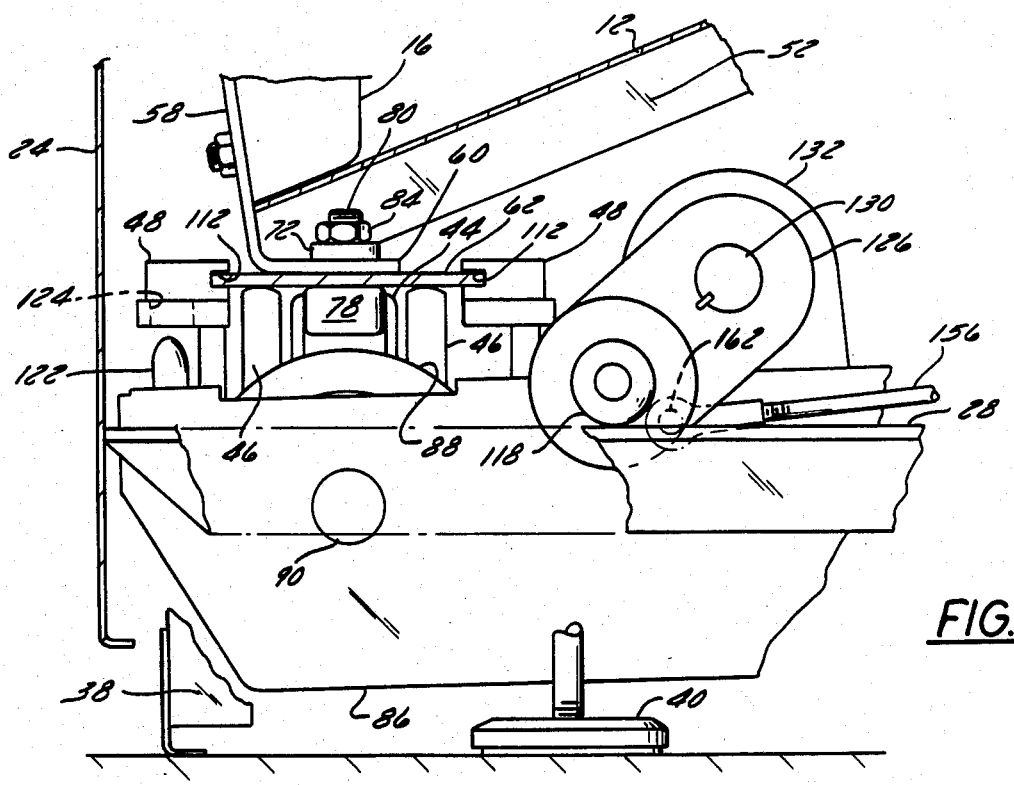
FIG. 5 is an enlarged, fragmentary detail view of the drive arrangement shown in FIG. 4 after disengagement.

Referring to FIGS. 2 and 3, a support frame 26 for the conveyor 10 and flights 12 includes spaced frame base members 28 transfixed to uprights 32. The base members 28 have a length which extends beyond the upright 32 under the decking 22 and provide support tracks for the drive means 18 as will be later understood. The top of each upright 32 carries an endless inside track 34 beneath which is fastened a diagonal strut 36 for bracing the upright 32 with frame base member 28. Longitudinal support members 38 are connected between the base members 28, 30. The support frame 26 is mounted above the floor level on regulable feet 40 which are adjustable relative to the floor. Throughout the path of the conveyor, except in the area of the drive means, angular guide tracks 42 (FIGS. 4 and 5) having vertical walls 44 are mounted to the base members 28 and support wheels 46 are journalled for rotation on the outside of the vertical walls 44. Spaced apart, parallel guide bars 48 are fastened to the frame members 28 only in the path of the drive means.

Each flight 12 includes a longitudinally extending flight support channel 52 which in turn mounts an inner roller 54 for movement on the upright track 34. The outer end of each flight 12 and its channel 52 is connected to an angular base bracket 56. The base bracket 56 has an inclined leg 58 to which the bumper 16 is bolted and a horizontal leg 60 overlying a link plate 62 which is movably mounted upon the support wheels 46.

As shown in FIGS. 6 and 8, each link plate 62 associated with flight 12 forms an element of the endless chain and is constructed of an elongated member having a concave end 64 and a convex end 66. The link plates 62 are connected one to the next by means of a spherical rod end bearing and cam roll pin connection. In particular, a bearing block 68 is welded to one end 64 of a link plate 62 and carries a rod end 72 which extends over the adjacent end 66 of the next link plate 62. The rod end 72 has an aperture 74 in which a spherical bearing 76 is mounted. A cam roll 78 is integrally attached at the lower end of a connecting pin 80 which extends upwardly through an aperture 82 formed in the next link plate 62 and through the mounting hole of the bearing 76. The pin 80 may be variously secured such as by a self-locking nut 84 to provide a flexible joint between adjacent link plates 62 and readily allow the disconnection of link plates as may be required.

The above-described support frame 26 also supports the drive means 18 in a drive tray 86 underneath the endless chain assembly as seen in FIGS. 2-5. The drive means 18 in the preferred embodiment is an arrangement located in a straight section of the conveyor and includes an elongated barrel screw 88 which is rotatably carried by a shaft 90. With further reference to FIGS. 6 and 7, the shaft 90 is supported by two radial bearings 92 attached to support brackets 93 which are joined to the bottom of the drive tray 86. A drive motor 94 and a reducer 96 are both supported on a pedestal base 98 of the drive tray 86 and drive the barrel screw shaft 90 by means of an endless flexible belt 100 engagable with an idler 102 on the tray, a reducer sprocket 104 and a shaft sprocket 106 as depicted in FIG. 11. The end thrust created by a load moving through the barrel screw 88 is taken up by a self-aligning thrust bearing 108. The barrel screw 88 has a helical groove 110 about the outer surface of screw and meshes with the cam roll 78 so the endless chain assembly moves along the closed path of the conveyor. As the cam roll 78 moves through the helical groove 110 of the barrel screw 88, each of the link plates 62 is positively and smoothly guided on both sides through the channels 112 formed in guide bars 48. This eliminates any sideways or substantial vertical movement of the link plates 62 during engagement or disengagement of the cam roll 78 with the helical screw 88. Outside the area of drive means, the cam roll 78 is guided between the inside surfaces of the vertical walls 44 of guide tracks 42 and each link plate 62 is movably supported upon the support wheels 46 rotatably journalled to the outside of the walls 44. The drive tray 86 may carry an oil reservoir and fittings (not shown) for lubrication of the barrel screw, bearings, and guide bars.

A distinctive feature of the present invention resides in the mounting of the drive means 18. Again referring to FIGS. 2 and 3, the above-described drive arrangement 18 is mounted entirely above the floor for movement in the drive tray 86 which is suspendedly fastened above the floor on the support frame 26 by two pairs of rollers 118, 120 which ride on the frame members 28. Locating pins 122 extending upwardly from the drive tray 86 cooperate with holes 124 in the bottom of the guide bars 48 to positively locate the drive means 18 in an operating position. As detailed in FIG. 7, each of the rollers 118 nearest the barrel screw 88 is rotatably mounted against a rubbing disc 124 to an arm 126 which depends from a collar 128 keyed on a rotatable shaft 130. The shaft 130 is supported at each end in a bearing block 132 mounted on the bracket 93 rising from the bottom of the drive tray 86. With this construction, the rollers 118 are rotatable about their own central axes as well as swingable about the central axis of the rotatable shaft 130. As detailed in FIG. 9, each of the rollers 120 furthest from the barrel screw 88 lies against an adjacent rubbing disc 136 and is rotatably mounted to the side of the drive tray 86. The rollers 120 then are designed and arranged to rotate only about their central axes.

Figure 12:
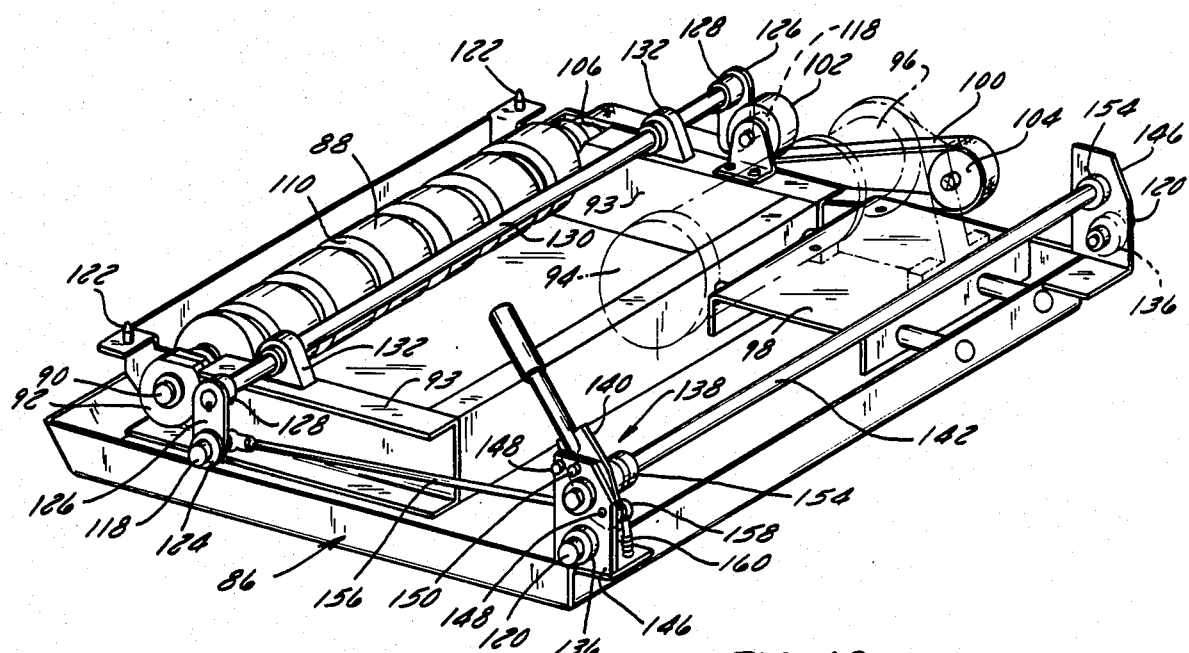
FIG. 12 is a perspective isolated view of the drive arrangement of the conveyor.

Referring to FIGS. 9, 10 and 12, an adjusting mechanism 138 for the drive tray 86 includes an actuating lever 140 rotatably positioned on a shaft 142 which extends through and beyond each side of the drive tray 86 and is held fixed against rotation on each side by a collar 144 welded to a bracket 146 on the drive tray 86. Stops 148 located on the bracket 146 define the positions of the adjusting mechanism 138 and a safety pin 150 is provided to ensure the lever 140 is not shifted accidentally. On the inside of the actuating lever 140 is a thrust washer 152 and a set collar 154 to prevent axial shifting of the shaft 142. A lower portion of the lever 140 is movably fastened to an elongated connecting rod 156 and a rod end 158 fixed in the bracket 146 and biased by a compression spring 160. The connecting rod 156 is joined to an eccentric 162 mounted on the swingable arm 126 which carries roller 118. By this construction, a toggle arrangement is provided wherein the lever 140 may be shifted from the operating position shown in FIG. 2, to a position wherein the connecting rod 156 assisted by the spring 160, forces the rollers 118 to swing, via the eccentric 162, upwardly about the axis of shaft 130. This motion causes the locating pins 122 to disengage from holes 124 and drop the barrel screw end of the drive tray 86 downwardly, after which continued pulling on the lever 140 results in rolling of the drive tray 86 on frame members 28 as seen in FIG. 3. The drive tray 86 may be pulled beyond the position of the uprights 32 for total accessibility from underneath the conveyor. In other words, the adjusting mechanism 138 just described enables the drive tray 86 to be selectively retractable for supporting the drive means 18 between an operating position at which the barrel screw 88 is engaged with the cam roll 78 and a service position at which the barrel screw 88 is disengaged from the cam roll 78 and then rolled away from underneath the conveyor for servicing of the drive arrangement. This feature is particularly advantageous in the preferred embodiment where one drive means 18 may be serviced while the other drive means continues to run the conveyor thereby minimizing any non-productive down time.

After the required maintenance is performed, the drive tray 86 is rolled back under the conveyor so that the locating pins 122 are aligned with holes 124 and the cam rolls 78 are properly aligned in the helical grooves 110 of the barrel screw 88. Thereafter, the lever 140 may be shifted to raise the drive tray 86 back up so the cam rolls 78 are actually engaged in operating drive position with the barrel screw 88.

Unlike prior art conveyors, the improved drive arrangement is entirely supported off the floor thereby minimizing contact with debris such as baggage tags, address labels, case handles and coat hangers which normally gravitates at the bottom of the conveyor and can cause clogging and noisy operation. In addition, the present invention eliminates the need for sometimes complicated and time consuming removal of conveyor flights and framework members prior to drive servicing and drive components directly connected to the floor. Furthermore, the invention provides a completely self-contained, rollable drive unit selectively retractable between operating and inspecting/servicing positions.

What is claimed is:

1. In a conveyor having a floor supported frame defining a closed planar path, an endless chain assembly adapted to move around said closed path, said conveyor employing a drive means disposed underneath and engageable with said endless chain assembly and adapted to provide motive force thereto such that said endless chain assembly will be moved about said closed planar path, the improvement comprising:

selectively retractable mounting means disposed above the floor, rollably suspended and tiltably mounted on said frame for supporting said drive means between an operating position at which said drive means is drivingly engageable with said endless chain assembly and a servicing position at which said drive means is disengageable and movable away from said endless chain assembly for inspection and maintenance, said mounting means including rollers rotatably mounted thereon for engagement with said frame, certain of said rollers also being swingably mounted on said mounting means for engagement with said frame.

2. A conveyor as recited in claim 1 wherein said mounting means comprises a drive tray having said rollers mounted thereon for engagement with said frame.

3. A conveyor as recited in claim 2 including guide means fastened to said frame and formed with apertures at the bottom thereof, said drive tray provided with locating pins adapted to fit within said apertures.

4. A conveyor as recited in claim 2 wherein said mounting means further includes a toggle actuating means for controlling the position of said drive tray relative to said frame.

5. A conveyor as recited in claim 2 wherein said drive means is self-contained in said drive tray.

6. A conveyor as recited in claim 2 wherein said one end of said drive tray is tiltable relative to said frame.

7. A conveyor as recited in claim 1 wherein said drive means is entirely suspended above the floor on said frame.

8. A conveyor useful for handling baggage comprising:
   a floor-supported frame defining a closed planar path;
   a plurality of pivotably connected links movable along said closed path;
   a load carrying member attached to each of said links, said links and said load carrying members forming an endless chain assembly adapted to move around said closed path;
   a plurality of pins interconnecting said links, each of said pins being provided with a cam roller;
   a drive means disposed underneath said endless chain assembly and engageable with said cam rollers to provide motive force to said endless chain assembly; and
   selectively retractable mounting means disposed above the floor and rollably mounted on said frame for supporting said drive means between an operating position at which said drive means is drivingly engageable with said cam rollers on said endless chain assembly and a servicing position at which said drive means is disengageable from said cam rollers and moveable away from said endless chain assembly for maintenance, said mounting means including rollers rotatably mounted thereon for engagement with said frame, certain of said rollers also being swingably mounted on said mounting means for engagement with said frame.

9. A conveyor as recited in claim 8 including guide means fixed to said frame in the area of said drive means, said guide means including channels formed therein which are engageable with said links and adapted to restrict sideways and vertical movement of said links.

10. A conveyor as recited in claim 9 including further guide means fastened to said frame in the area outside said drive means, said further guide means comprising vertical tracks between which said cam roller is engaged, said vertical tracks also carrying support wheels supporting said links on their underside.

11. A conveyor useful in the handling of baggage comprising:
    a floor-supported frame defining a closed planar path;
    an endless chain assembly including a plurality of load carrying flights adapted to move around said closed path;
    a plurality of cam rollers carried by said endless chain assembly;
    a drive arrangement disposed underneath and engageable with said cam rollers on said endless chain assembly to provide motive force thereto; and
    selectively retractable mounting means disposed above the floor and rollably suspended to said frame for supporting said drive arrangement between an operating position at which said drive arrangement is drivingly engageable with said cam rollers on said endless chain assembly and a servicing position at which said drive arrangement is disengageable from said cam rollers and tiltable downwardly from said endless chain assembly.

12. A conveyor as recited in claim 11 wherein said mounting means includes a drive tray having first and second sets of rollers rotatably mounted thereon for engagement with said frame, one of said sets of rollers also being swingably mounted on said tray for engagement with said frame.

13. A conveyor as recited in claim 12 wherein each of said sets of rollers comprise a pair of rollers, each roller of said set of rollers swingably mounted on said tray being mounted on each side of the drive tray on an arm keyed to a shaft having an axis of rotation parallel to the axis of said drive means such that movement to one of said swingably mounted rollers will induce like movement to the other of said swingably mounted rollers.

14. A conveyor as recited in claim 13 including toggle actuating means for adjusting the position of said drive tray, said toggle actuating means comprising an actuating lever mechanism movably mounted to said drive tray, a connecting rod movably fastened at one end to said lever mechanism and operatively joined at its other end to one of said swingably mounted rollers, said toggle actuating mechanism constructed and arranged such that movement to said lever mechanism will cause said swingably mounted rollers to swing upwardly and thereby disengage said drive means from said cam rollers and tilt said drive tray downwardly.

15. A conveyor as recited in claim 14 wherein said lever actuating mechanism and connecting rod are spring-biased in a toggle arrangement to define positions corresponding to said operating and servicing positions.

16. A conveyor as recited in claim 14 wherein said connecting rod is connected to an eccentric mounted on said arm.

17. A conveyor as recited in claim 12 wherein said drive tray is movable from a position underneath the conveyor to a position removed from underneath the conveyor.

18. A conveyor as recited in claim 12 wherein said frame includes spaced frame base memberts, said base members being joined to uprights and having a length extending beyond said uprights to form support tracks for said drive tray.

19. A conveyor as recited in claim 11 wherein said drive arrangement is engageable with said cam rollers at multiple locations along said endless chain assembly.

* * * * *